United States Patent Office 3,682,869
Patented Aug. 8, 1972

3,682,869
PROCESS FOR THE POLYMERIZATION OF 2-PYRROLIDONE WITH CARBON DIOXIDE AS ACTIVATOR
Peter A. Jarovitzky, Stamford, Conn., assignor to Radiation Research Corporation, Stamford, Conn.
No Drawing. Filed Sept. 3, 1970, Ser. No. 69,495
Int. Cl. C08g 20/16
U.S. Cl. 260—78 P   3 Claims

ABSTRACT OF THE DISCLOSURE

In the polymerization of 2-pyrrolidone in the presence of an alkaline polymerization catalyst and carbon dioxide, the improvement which comprises adding said carbon dioxide to a concentrated reaction mass having a molar ratio of from about 1 to about 4 mols of 2-pyrrolidone per mol of alkaline polymerization catalyst and then diluting said concentrated, carbonated reaction mass with an amount of 2-pyrrolidone sufficient to provide at least 9 mols of total 2-pyrrolidone per mol of alkaline polymerization catalyst before said carbonated reaction mass is polymerized.

---

This invention relates to the polymerization of 2-pyrrolidone.

Methods for the polymerization of 2-pyrrolidone to form polypyrrolidone have been previously disclosed, for example, in U.S. Pats. 2,638,463; 2,809,958 and 2,891,038. In general, these methods involve the polymerization of 2-pyrrolidone in the presence of an alkaline polymerization catalyst, and, usually, with an activator as well.

The polymer formed from 2-pyrrolidone is believed to be a linear polyamide, which has come to be known as nylon-4, having the structure:

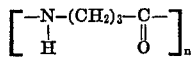

The polymer may be shaped into ribbons, films, molded articles and fibers. Because of its hydrophilic properties, which closely resemble those of cotton and silk, nylon-4 fiber has long been recognized as having great commercial potential. For example, fabrics made from nylon-4, in contrast with other presently available synthetic fibers, are as readily dyed as cotton; they may be ironed at cotton temperatures; they rapidly dissipate static charges; and, in particular, they possess the comfort of cotton and wool.

Nylon-4 fiber has never been made commercially, however, primarily because efforts to manufacture the fiber by the economical melt spinning method have met with almost universal failure. In the copending application of Carl E. Barnes, Ser. No. 763,898, filed Sept. 30, 1968, entitled "Polymers of 2-Pyrrolidone," now abandoned, and in the continuation-in-part application thereof filed concurrently herewith, Ser. No. 69,471, filed Sept. 3, 1970, both applications being hereby incorporated by reference herein, there is disclosed and claimed novel polymers of 2-pyrrolidone that can be converted into useful shaped articles, such as fibers, filaments, rods, bristles, films, ribbons and the like, by the inexpensive method of melt extrusion.

The polymers of 2-pyrrolidone of the aforesaid Barnes applications exhibit a marked increase in heat stability as compared to prior art polymers, which is particularly important in the formation of fibers by melt extrusion.

The aforesaid Barnes applications disclose that the new nylon-4 polymers can be prepared by polymerizing 2-pyrrolidone using an alkaline polymerization catalyst in the presence of $CO_2$. For example, polymerization can be effected by bubbling $CO_2$ through a mixture of 2-pyrrolidone and an alkali metal salt of 2-pyrrolidone, e.g. sodium or potassium pyrrolidonate, the alkali metal pyrrolidonate functioning as an alkaline polymerization catalyst, and then polymerizing the carbonated mixture.

The new polymer of the Barnes applications can also be prepared by reacting $CO_2$ with the alkali metal salt of 2-pyrrolidone to form an adduct of $CO_2$ and the alkali metal pyrrolidonate, and then polymerizing the 2-pyrrolidone monomer in the presence of the adduct.

The specific details of the formation of the new nylon-4 using $CO_2$ can be found in the aforementioned Barnes applications, and therefore the polymerization procedure will only be briefly discussed herein. The reaction conditions for the polymerization of 2-pyrrolidone in the presence of $CO_2$ are essentially the same as that already described in the prior art. In general, 2-pyrrolidone monomer may be polymerized at a temperature from about 18° C. to about 100° C., preferably 25° C. to 70° C., and most preferably 25° C. to 60° C., under a pressure ranging from subatmospheric to superatmospheric in the presence of the alkaline polymerization catalyst. Bulk polymerization or suspension polymerization can be used. A technique using an anhydrous nonsolvent, such as hydrocarbon, is suitable, as described in U.S. Pat. 2,739,959.

The catalyst may be any alkaline catalyst for polymerizing 2-pyrrolidone, such as those disclosed in previously mentioned U.S. Pat. 2,638,463, except that the alkali metals or any other agent that may reduce the sensitive 2-pyrrolidone ring thereby introducing impurities which may be harmful to the polymerization reaction are not used. Suitable catalysts are derivatives of the alkali metals, e.g. the hydrides, hydroxides and oxides of the alkali metals. The alcoholates of the alkali metals, such as sodium methylate, or a quaternary ammonium base as described in U.S. Pat. 2,973,343 of the formula:

$$R_1-\underset{\underset{OH}{|}}{\overset{\overset{R_2}{|}}{N}}-R_3 \quad R_4$$

wherein $R_1$, $R_2$ and $R_3$ are lower alkyl radicals and $R_4$ is an alkyl, aryl or aralkyl radical, may be used with good results. The aforesaid Barnes applications provide a complete description of the large number of alkaline polymerization catalysts that can be used.

The catalyst may be used in an amount of 0.5 to 50% by weight, based on the 2-pyrrolidone monomer, preferably 5 to 30 wt. percent, most preferably 8 to 20 wt. percent.

The preferred proportion of $CO_2$ and polymerization catalyst is about 2 mols of the catalyst per mol of $CO_2$. The temperature at which the $CO_2$ is added to the catalyst may be varied widely, good results having been obtained at temperatures ranging from 18° C. (approximately the freezing point of the solution of the catalyst in monomer) to 130° C. or higher.

Suitably, the 2-pyrrolidone monomer will be contacted with 0.01 to 10 wt. percent of $CO_2$, based on the weight of the 2-pyrrolidone monomer. Presently preferred amounts are 0.2 to 6 wt. percent, based on the weight of the 2-pyrrolidone, while 0.5 to 5 wt. percent are the most preferred amounts.

The amount of carbon dioxide can also be expressed as a mol percent of the mols of alkaline polymerization catalyst. The amount of carbon dioxide would thus be from about 0.06 to 60 mol percent, based on the mols of the alkaline polymerization catalyst, but higher amounts, e.g. up to about 80 mol percent $CO_2$ based on the mols of alkaline polymerization catalyst have been used. Generally, the amount of $CO_2$ on a molar basis will be from 10 to 80 mol percent, based on the mols of alkaline polymerization catalyst.

It is possible to introduce $CO_2$ into the system other than by bubbling $CO_2$ into the mixture of 2-pyrrolidone and alkaline polymerization catalyst. For example, the source of $CO_2$ can be a compound that will transfer $CO_2$ to the mixture of 2-pyrrolidone monomer and alkaline polymerization catalyst, provided that the anion remaining after loss of $CO_2$ from the compounds is not deleterious to the polymerization. Adducts of carbon dioxide and an alkali metal or quaternary ammonium pyrrolidonate can be added to a mixture of 2-pyrrolidone monomer and alkaline polymerization catalyst, as can adducts of $CO_2$ and an alkali metal or quaternary ammonium caprolactamate, with or without any $CO_2$ gas added to the system. These adducts are added to the system on the same weight basis as the $CO_2$.

A convenient method for preparing the adducts is to bubble $CO_2$ through an anhydrous mixture of the pyrrolidonate and 2-pyrrolidone under vacuum until there is a sharp rise in pressure indicating that the $CO_2$ is no longer being readily absorbed. The adduct is precipitated by adding benzene or other organic precipitants to the solution. There is recovered from the precipitate a free-flowing, nonhygroscopic, white powder. Alternatively, the organic precipitant can be added to an hydrous solution of pyrrolidonate in 2-pyrrolidone before the $CO_2$ is bubbled through the solution, in which case the precipitate forms as the $CO_2$ is absorbed.

Since it is necessary to react $CO_2$ with anhydrous pyrrolidonate, it is preferred to form the $CO_2$-pyrrolidonate adduct by adding $CO_2$ to an anhydrous solution of pyrrolidonate in 2-pyrrolidone, where the pyrrolidonate is formed in situ as described above.

In a similar manner, the adduct of $CO_2$ and caprolactamate is formed by bubbling $CO_2$ through an anhydrous solution of caprolactamate in caprolactam and adding the organic precipitant before or after the $CO_2$ addition. Generally, when the caprolactamate is formed in situ, temperatures in excess of 90° C. are avoided.

While it is preferred to utilize the polymerization catalyst with carbon dioxide as the sole polymerization activator, other polymerization activators may be used in conjunction with carbon dioxide, such as the acyl compounds discussed in previously mentioned U.S. Pat. 2,809,958, or any of the activators mentioned in U.S. Pats. 2,912,415; 3,016,366; 3,022,274; 3,028,369; 3,033,831; 3,040,004; 3,042,659; 3,060,153; 3,061,593; 3,069,392; 3,135,719; 3,148,174; 3,158,589; 3,174,951; 3,180,855, and 3,210,324.

When it is desired to use one of these activators along with $CO_2$ acetyl pyrrolidone, adipyl dipyrrolidone or phenylisocyanate are preferred. When employed, the activator may be used in an amount of 0.001 to 25% by weight, based on the 2-pyrrolidone monomer, preferably 0.01 to 5 wt. percent, most preferably 0.1 to 3 wt. percent.

It is desirable to carry out the polymerization in the substantial absence of water, although anhydrous conditions are not essential; e.g. the amount of water should not exceed about 0.1% by weight of the 2-pyrrolidone monomer.

A preferred technique in the aforesaid application is to heat under vacuum to 120° C. or below a mixture of 10 mols of 2-pyrrolidone and 1 mol of KOH while removing water formed during the reaction to provide an anhydrous mixture of potassium pyrrolidonate and 2-pyrrolidone and to add the $CO_2$ to this mixture. We have now found higher polymerization rates and higher polymer yields can be obtained if the $CO_2$ is added to a more highly concentrated mixture of 2-pyrrolidone and alkaline catalyst (with respect to the alkaline catalyst) followed by dilution of the carbonated mass to the desired 2-pyrrolidone alkaline catalyst molar ratio.

In particular, the present invention resides in adding carbon dioxide to a mixture of from about 1 to about 4 mols of 2-pyrrolidone per mol of alkaline polymerization catalyst, and then diluting the carbonated mass with an amount of 2-pyrrolidone sufficient to provide at least 9 mols, e.g. up to 20 mols, of total 2-pyrrolidone per mol of alkaline catalyst added. The techniques of addition of carbon dioxide and the polymerization of the carbonated and diluted mass is as set forth above in the aforesaid Barnes applications. The use of less than 1 mol of 2-pyrrolidone per mole of alkaline catalyst may give rise to difficulties, because such mixtures may be too thick for carbon dioxide gas to penetrate efficiently.

In a preferred embodiment of the invention, the alkaline polymerization catalyst is formed in situ by adding an alkali metal or alkaline earth metal compound, preferably KOH, to 2-pyrrolidone and heating the mixture to 120° C. or below under vacuum while removing the water formed, the $CO_2$ is added to this mixture and the thus carbonated mixture is diluted with 2-pyrrolidone and polymerized. Preferably, from 2.5 to 5 mols of 2-pyrrolidone are heated together with one mole of KOH and 2-pyrrolidone is added after the mixture is carbonated to give a molar ratio of 2-pyrrolidone to KOH of at least 10:1, based on the total 2-pyrrolidone and KOH added.

The present invention is illustrated by the following examples.

Examples 1–6

To a round bottom 500 ml. flask equipped with a thermometer, a gas inlet tube, a stirrer and a Claisen distillation head leading through a condenser to a vacuum source, was charged 264 g. 2-pyrrolidone, an amount of KOH pellets (85% assay), 4.3 g. $KHCO_3$ and 1.2 g. $K_2CO_3$. The $KHCO_3$ and $K_2CO_3$ were provided as particulate material in accordance with the teachings of copending application of Peter A. Jarovitzky, filed concurrently herewith, Ser. No. 69,496, entitled "Polymerization of 2-Pyrrolidone." The flask was evacuated to pump capacity using a nitrogen bleed (3 mm. Hg). The reaction mass was heated to about 120° C. over a period of about 30 minutes so as to remove the water formed without distilling monomer, after which time the contents of the flask were cooled to 50° C. The nitrogen bleed was then cut off and carbon dioxide added until there was a rise in pressure in the flask indicating that the carbon dioxide was fully absorbed. At this point, the $CO_2$ flow was cut off, the pressure brought to atmospheric with nitrogen, and the contents were either placed directly in a polymerization oven maintained at 50° C. or were first diluted with additional 2-pyrrolidone before being placed in the oven. In Examples 1 and 2, the amount of KOH pellets was 20.4 grams, such that the 2-pyrrolidone/KOH molar ratio was 10:1. The contents of the reaction vessel for Examples 1 and 2 were placed directly into the polymerization oven. In Examples 3–6, the amount of KOH pellets was sufficient to provide an initial 2-pyrrolidone/KOH molar ratio of 2.5:1, 3:1, 4:1 and 5:1, and the carbonated reaction masses for Examples 3–6 were diluted with amounts of 2-pyrrolidone to give a molar ratio of total added 2-pyrrolidone/KOH of 10:1 before they were placed in the 50° C. polymerization oven. Table 1 reports the results obtained when the samples at a 10:1 2-pyrrolidone/KOH molar ratio were polymerized.

TABLE I

| | Molar ratio 2-pyrrolidone: KOH | | Results of polymerization of "diluted" carbonated reaction mass | | | |
|---|---|---|---|---|---|---|
| | | | Initial polymerization rate | Conversion | | Polymer intrinsic |
| Ex. | Initial | Final | (percent/hr.) | Hours | Percent | viscosity [1] |
| 1 | 10/1 | | 1.0 | 60 | 49 | 9.7 |
| 2 | 10/1 | | 0.9 | 60 | 54 | 9.7 |
| 3 | 2.5/1 | 10/1 | 1.1 | 44 | 40 | 8.6 |
| 4 | 3/1 | 10/1 | 1.0 | 46 | 50 | 8.8 |
| 5 | 4/1 | 10/1 | 1.4 | 45 | 60 | 9.2 |
| 6 | 5/1 | 10/1 | 1.2 | 42 | 47 | 8.6 |

[1] Intrinsic viscosity measured at 30° C. and reported as deciliters/gram using formic acid as solvent.

Examples 3–6 show that either the initial polymerization rate or the time to reach 45–50% conversion or both can be improved by the use of the dilution technique herein. Particularly good results are obtained at an initial 2-pyrrolidone/KOH molar ratio of 4:1 to 5:1. This means that the polymerization time can be decreased and/or more monomer can be converted to polymer in a given time, both of which being very important factors in a continuous polymerization process.

Examples 7–9

The procedure of Examples 3–6 was followed using a different sample of 2-pyrrolidone. The results of polymerizing the 9:1 and 10:1 2-pyrrolidone/KOH molar ratio samples are reported in Table II below. This shows that higher initial rates of polymerization can be obtained than are reported in Table I.

TABLE II

| Ex. | Molar ratio 2-pyrrolidone: KOH | | Results of polymerization of "diluted" carbonated reaction mass | | | |
|---|---|---|---|---|---|---|
| | Initial | Final | Initial polymerization rate (percent/hr.) | Conversion | | Polymer inherent viscosity [1] (dl./g.) |
| | | | | Hours | Percent | |
| 7 | 4/1 | 9/1 | 2.5 | 40 | 61 | 4.4 |
| 8 | 5/1 | 10/1 | 2.5 | 46 | 70 | 4.3 |
| 9 | 5/1 | 10/1 | 2.6 | 43 | 71 | 4.6 |

[1] Inherent viscosity measured at 30° C. as 0.5 g./dl. solution in anhydrous hexafluoroisopropanol.

What is claimed is:

1. In the polymerization of 2-pyrrolidone in the presence of an alkaline polymerization catalyst and carbon dioxide as a polymerization activator to form a solid polymer, the improvement which comprises adding said carbon dioxide to a concentrated reaction mass having a molar ratio of from about 1 to about 4 mols of 2-pyrrolidone per mol of alkaline polymerization catalyst and then diluting said concentrated, carbonated reaction mass with an amount of 2-pyrrolidone sufficient to provide at least 9 mols of total 2-pyrrolidone per mol of alkaline polymerization catalyst and an amount of said alkaline polymerization catalyst of at least 0.5% by weight, based on the weight of the 2-pyrrolidone, before said carbonated reaction mass is polymerized.

2. The process according to claim 1, wherein said alkaline polymerization catalyst is formed in situ by reacting a portion of the 2-pyrrolidone monomer with an alkali metal, alkaline earth metal or ammonium hydroxide to form the salt of 2-pyrrolidone, said concentrated reaction mass having a molar ratio of from 4 to 5 mols of total 2-pyrrolidone per mol of said hydroxide.

3. The process according to claim 1, wherein from 4 to 5 mols of 2-pyrrolidone are heated with 1 mol of an alkali metal hydroxide under vacuum for a time sufficient to form the alkali metal salt of 2-pyrrolidone, said carbon dioxide is added to the reaction mass thus obtained and the carbonated reaction mass is admixed with at least 9 mol of 2 - pyrrolidone before the reaction mass is polymerized.

References Cited
UNITED STATES PATENTS 2,907,755  10/1959  Lautenschlager et al. _ 260—78 L
2,912,415  11/1959  Black et al. _____ 260—78 P
3,174,951  3/1965  Taber _____ 260—78 P HAROLD D. ANDERSON, Primary Examiner U.S. Cl. X.R.

260—33.4 R